United States Patent
Ito et al.

(10) Patent No.: US 8,237,772 B2
(45) Date of Patent: Aug. 7, 2012

(54) MOVING PICTURE STORAGE SYSTEM, MOVING PICTURE STORAGE METHOD, AND MOVING PICTURE STORAGE PROGRAM

(75) Inventors: Hironori Ito, Tokyo (JP); Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 989 days.

(21) Appl. No.: 12/293,864

(22) PCT Filed: Dec. 8, 2006

(86) PCT No.: PCT/JP2006/324555
§ 371 (c)(1),
(2), (4) Date: Sep. 22, 2008

(87) PCT Pub. No.: WO2007/111006
PCT Pub. Date: Oct. 4, 2007

(65) Prior Publication Data
US 2009/0207317 A1    Aug. 20, 2009

(30) Foreign Application Priority Data
Mar. 27, 2006  (JP) ................................ 2006-086582

(51) Int. Cl.
*H04N 7/14* (2006.01)
(52) U.S. Cl. ................ 348/14.13; 348/14.12; 348/14.08
(58) Field of Classification Search .... 348/14.01–14.06, 348/699; 275/240.16
See application file for complete search history.

(56) References Cited

U.S. PATENT DOCUMENTS
6,339,760 B1 * 1/2002 Koda et al. .................... 704/278
2002/0106198 A1 * 8/2002 Suzuki .......................... 386/111

FOREIGN PATENT DOCUMENTS
| CN | 1368816 A | 9/2002 |
|----|-----------|--------|
| EP | 0656729 B1 | 2/2000 |
| EP | 1229742 A2 | 8/2002 |
| JP | 1994276427 A | 9/1994 |
| JP | 1995154802 A | 6/1995 |
| JP | 1996237133 A | 9/1996 |

(Continued)

OTHER PUBLICATIONS

International Search Report for PCT/JP2006/324555 mailed Jan. 30, 2007.

(Continued)

*Primary Examiner* — Melur Ramakrishnaiah
(74) *Attorney, Agent, or Firm* — Michael Dryja

(57) ABSTRACT

When a start recording instruction or an end recording instruction is transmitted from a terminal device, a DTMF detector (106) detects a DTMF signal and supplies the detection results to a control module (107). The control module (107) supplies the received start recording instruction or end recording instruction to an image data converter (105) and a switch (108). When a start recording instruction is received as input, the image data converter (105) converts the reception image data (103) to image data that have undergone intra-mode coding and supplies the result to the switch (108). The switch (108) supplies a storage device (110) with the image data that were supplied from image data converter (105) at the time that a start recording instruction is received as input, and supplies the storage device (110) with reception image data (103) from the time that recording has started until the input of an end recording instruction.

9 Claims, 16 Drawing Sheets

FOREIGN PATENT DOCUMENTS

| | | | |
|---|---|---|---|
| JP | 1998164556 A | | 6/1998 |
| JP | 1998243399 A | | 9/1998 |
| JP | 2000078531 A | | 3/2000 |
| JP | 2000206994 A | | 7/2000 |
| JP | 2002300528 A | | 10/2000 |
| JP | 2001061142 A | | 3/2001 |
| JP | 2001339460 A | | 12/2001 |
| JP | 2002016924 A | | 1/2002 |
| JP | 2002204451 A | | 7/2002 |
| JP | 2002232847 A | | 8/2002 |
| JP | 2004153631 A | | 5/2004 |
| JP | 2005136775 A | * | 5/2005 |
| JP | 2005229547 A | | 8/2005 |
| JP | 2005323353 A | | 11/2005 |
| WO | 2006016466 A1 | | 2/2006 |

OTHER PUBLICATIONS

International Preliminary Report on Patentability for PCT/JP2006/324555 issued Oct. 21, 2008.

Russian Office Action for RU 2008141294/09(053551) dated May 18, 2009.

Supplementary European Search Report for EP 06 83 4310 dated Apr. 8, 2011.

Chinese Office Action for CN200680053920.3 dated Apr. 29, 2009.

* cited by examiner

MOVING PICTURE STORAGE SYSTEM, MOVING PICTURE STORAGE METHOD, AND MOVING PICTURE STORAGE PROGRAM

TECHNICAL FIELD

The present invention relates to a moving picture storage system, a moving picture storage method, and moving picture storage program for converting and storing moving pictures that have been received as input.

BACKGROUND ART

Videophone services and moving picture distribution services that use portable terminal devices in a line-switching network are coming into wide use. Services in which moving picture data received from portable terminal devices in a line-switching network or IMS (IP Multimedia Subsystem)/NGN (Next Generation Network) are stored in a server and then distributed by the server are expected to become widely popularized.

MPEG-4 (ISO/IEC 14496-2: 2003 "Information Technology Coding of Audio and Video Visual Objects—Part 2: Visual") is widely used as a moving picture coding method in Third Generation Partnership Project (3GPP) portable terminal devices.

MPEG-4 includes intramode, in which coding uses only the image of a current frame, and intermode, in which coding is carried out by referring to the images of past frames, In intramode, input pixels are subjected to a DCT (Discrete Cosine Transform) that is carried out in units referred to as "macroblocks," following which the DCT coefficients undergo variable-length coding. In intermode, motion compensation forecasting is carried out between input pixels and decoded pixels of past frames to find differential pixels. After the differential pixels are subjected to DCT, the motion vectors and DCT coefficients are subjected to variable-length coding.

When storing moving picture data that have been transmitted from a terminal device, the data of designated intervals in the moving picture data transmitted at real time from the terminal device are stored in a moving picture storage device (for example, refer to Patent Document 1). Because the images of previous frames cannot be referred to for the leading frame of the stored image at the time of reproduction, the leading frame must be converted to data that have been subjected to intramode coding.

FIG. 1 is a block diagram showing an example of the typical configuration of a moving picture storage system. In the moving picture storage system shown in FIG. 1, data receiver 901 receives reception data 900 from a terminal device (not shown). Reception data 900 include control data 902, which is information related to the image coding, image data 903, and audio data 904. Control data 902 and image data 903 are applied as input to image data converter 905. Image data converter 905 converts the leading frame of image data 903 that has been received to an intramode frame based on information obtained from control data 902. The image data after conversion are then supplied to switch 906. Audio data 904 are applied as input to switch 906.

When notified of the start of conversion by conversion instruction signal 909, switch 906 applies audio data 904 and image data that have undergone conversion as input to data storage unit 908 until notified of the end of conversion by conversion instruction signal 909.

However, when the moving picture storage system stores moving pictures that are transmitted from terminal devices in real time, instructions of the start and end of storage must be sent from the terminal devices to the moving picture storage system. However, the problem frequently arises that the operator of a terminal device does not recognize the method of instructing the start and end of storage.

Patent Document 1: JP-A-2002232847 (paragraphs 0002-0005, FIG. 2)

DISCLOSURE OF THE INVENTION

The present invention is directed to solving the above-described problems and has as its object the provision of a moving picture storage system, moving picture storage method, and moving picture storage program for transmitting to a terminal device guidance images relating to the method of operation regarding the start and end of storage and then storing moving pictures transmitted in real time from terminal devices based on instruction signals from the terminal device.

The moving picture storage system according to the present invention is provided with: a receiver for receiving and supplying a signal that contains at least one among audio data and image data from a terminal device; a transmitter for, when storing at least one among audio data and image data that have been supplied from the receiver, transmitting to the terminal device image, speech, or image and speech as guidance of the method for notifying start of storage; a detector for detecting a notification signal that has been transmitted from a terminal device; and a converter for using detection results from the detector to convert image data of the time that storage has started to intramode.

In the first embodiment of the present invention, the receiver receives at least one among audio data (for example, packet data) and image data (for example, packet data) from a terminal device.

In the second embodiment of the present invention, the receiver separates at least one among audio data and image data from a signal (for example, a multiplexed signal) received from a terminal device.

The moving picture storage system may be provided with a synchronizing module for adjusting synchronization between audio data and image data according to the data amount in image data after conversion by the converter.

The moving picture storage system may be provided with a control module for implementing control such that the code amount in intramode image data is a predetermined value.

The moving picture storage system may be provided with a control module for controlling the amount of intramode coding such that the code amount after conversion by the converter is equal to the code amount before conversion.

According to the present invention, a method for instructing the start and end of storage is provided from a moving picture storage system to terminal devices for transmitting instructions for the start and end of storage in a moving picture storage system from terminal devices, and based on the instruction signals from the terminal devices, moving pictures transmitted from terminal devices in real time can be stored.

BEST MODE FOR CARRYING OUT THE INVENTION

Explanation next regards the embodiments of the present invention with reference to the accompanying figures.

First Embodiment

Figure 1:
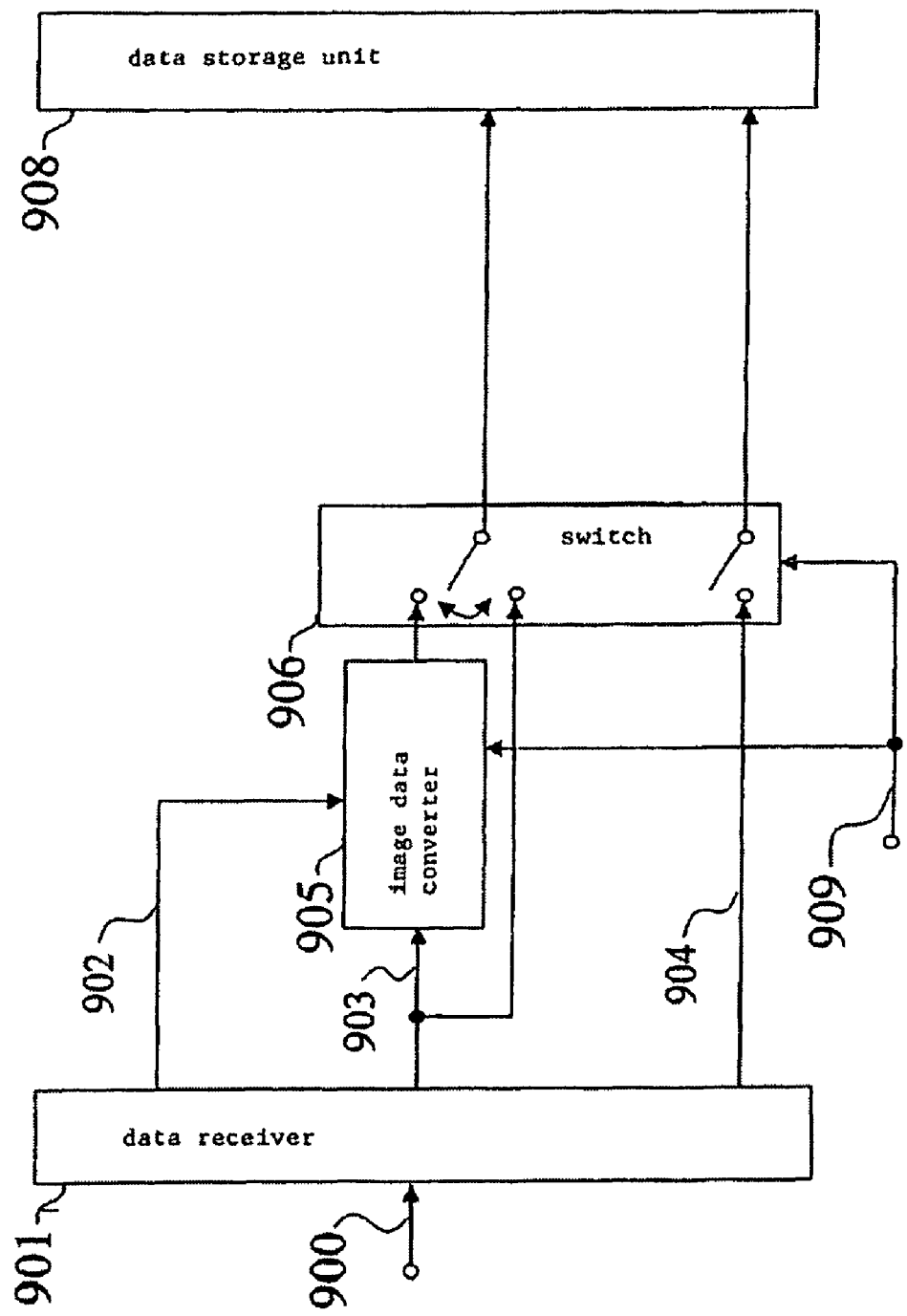
FIG. 1 is a block diagram showing an example of the typical configuration of a moving picture storage system.
Figure 2:
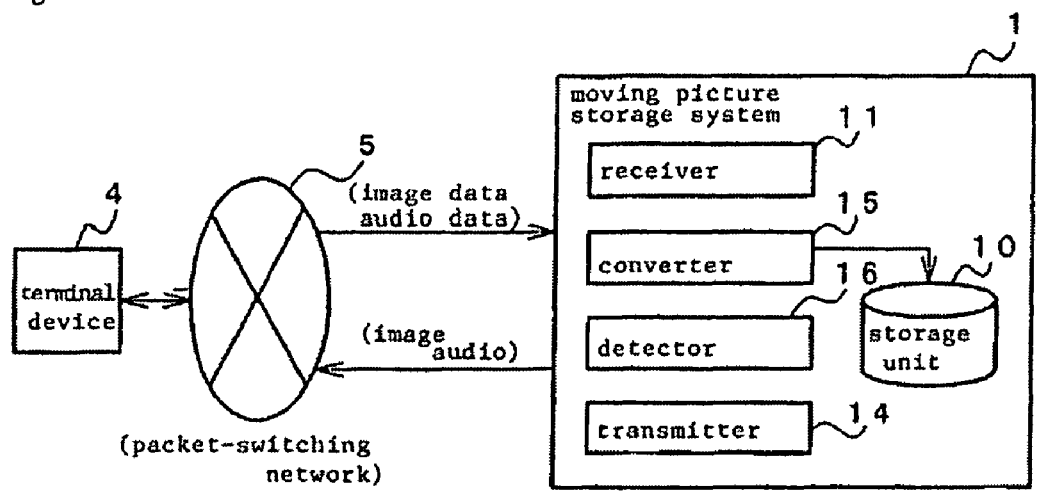
FIG. 2 is a block diagram showing the configuration of the first embodiment of the moving picture storage system of the present invention.

FIG. 2 is a block diagram showing the configuration of the first embodiment of the moving picture storage system according to the present invention. Moving picture storage system 1 shown in FIG. 2 is a moving picture storage system in packet-switching network 5. In the present embodiment, the parameters in audio/image coding are determined by carrying out capability exchange based on SIP/SDP as prescribed by IETF RFC3261/RFC2327 between a portable terminal, as one example of terminal device 4, and moving picture storage system 1 when initiating communication. Moving picture storage system 1 next transmits to terminal device 4 guidance that provides a method for transmitting notification signals for instructing the start and end of moving picture storage (storage start/end notification method). Moving picture storage system 1 stores moving pictures received from terminal device 4 based on notification signals received from terminal device 4. In addition, DTMF signals based on, for example, RFC2833 are used as the instruction signal from terminal device 4.

Moving picture storage system 1 shown in FIG. 2 is provided with: receiver 11 for receiving at least one among audio data and image data from terminal device 4, transmitter 14 for, when storing in storage unit 10 at least one among image data and audio data that have been received, transmitting to terminal device 4 at least one among a guidance image for providing guidance regarding the method of notifying, for example, the start of storage, and guidance speech for providing guidance regarding the method of notifying, for example, the start of storage; detector 16 for detecting a notification signal that has been transmitted from terminal device 4; and converter 15 for using the detection results of detector 16 to convert image data of the time that storage has started to intramode. In addition, the guidance indicates the method of operation in terminal device 4.

Second Embodiment

Figure 3:
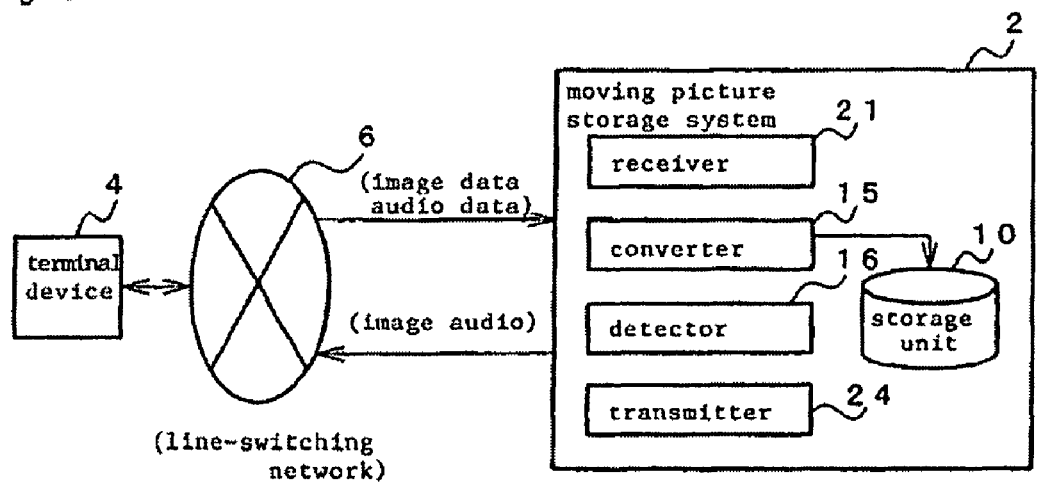
FIG. 3 is a block diagram showing the configuration of the second embodiment of the moving picture storage system of the present invention.

FIG. 3 is a block diagram showing the configuration of the second embodiment of the moving picture storage system according to the present invention. Moving picture storage system 2 shown in FIG. 3 is a moving picture storage system based on H.324M, which is the standard for ITU-T in line-switching network 6. In the present embodiment, parameters in the multiplex/separation and audio/image coding of control/audio/image data based on H.223 are determined by carrying out capability exchange based on H.245 between a portable terminal as one example of terminal device 4 and moving picture storage system 2 at the start time of communication. Moving picture storage system 2 next transmits to terminal device 4 guidance for providing a method of transmitting notification signals for instructing the start and end of moving picture storage. Moving picture storage device 2 then stores moving pictures received from terminal device 4 based on notification signals received from terminal device 4. In addition, DTMF signals are used as the instruction signals from terminal device 4.

Moving picture storage system 2 shown in FIG. 3 is provided with: receiver 21 for receiving at least one among audio data and image data from terminal device 4; transmitter 24 for, when storing in storage unit 10 at least one among audio data and image data that have been received, transmitting to terminal device 4 at least one among guidance images for providing guidance regarding, for example, the method of notifying the start of storage and guidance speech for providing guidance regarding, for example, the method of notifying the start of storage, detector 16 for detecting notification signals transmitted from terminal device 4; and converter 15 for using the detection results of detector 16 to convert image data of the time that storage has started to intramode. The guidance indicates the method of operation in terminal device 4.

WORKING EXAMPLES

First Working Example

Figure 4:
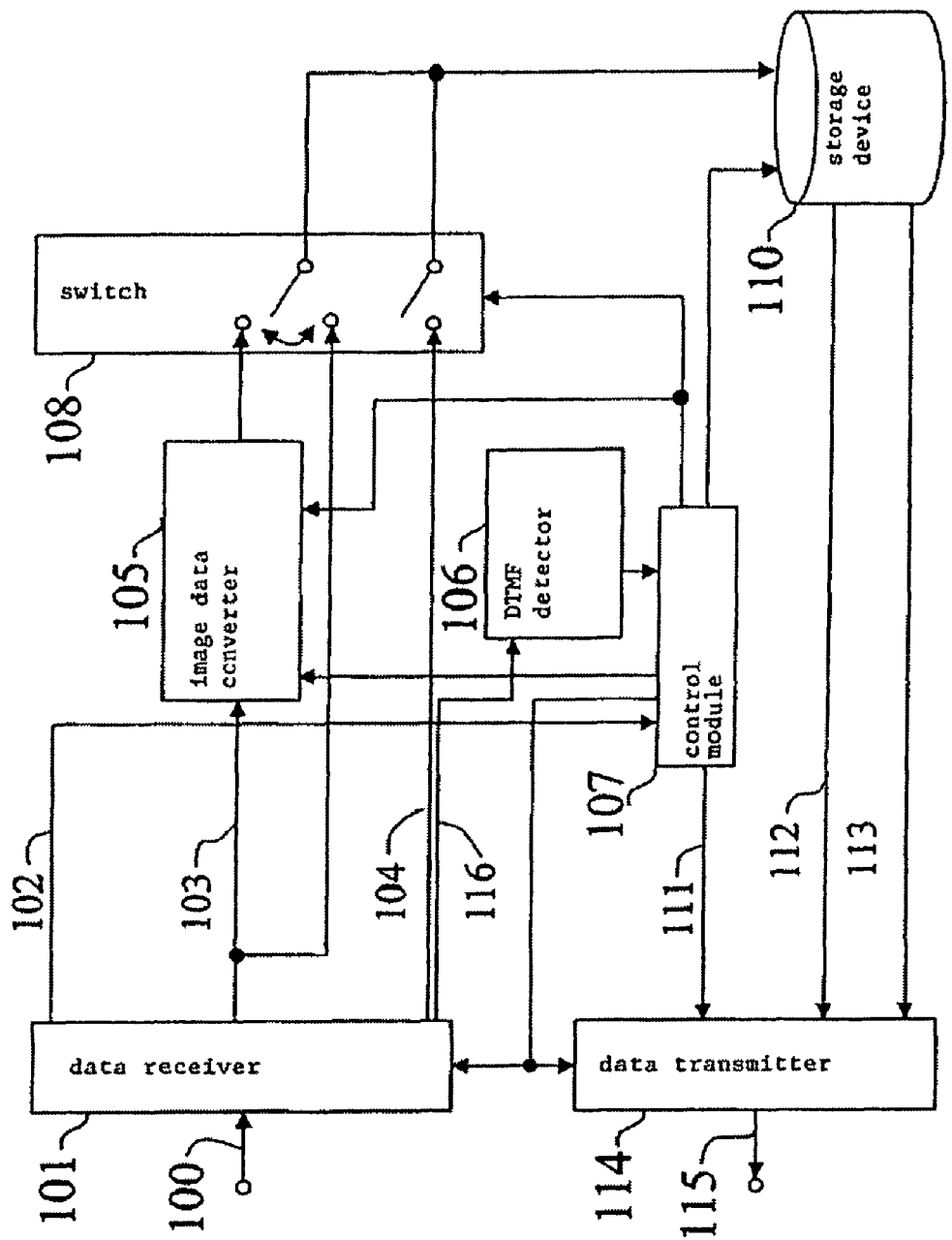
FIG. 4 is a block diagram showing the first working example of the moving picture storage system of the present invention.

Explanation next regards the first working example of the moving picture storage system (moving picture storage device) according to the present invention with reference to FIG. 4. The present working example corresponds to the first embodiment (see FIG. 2) that is used in a packet-switching network. The present working example and each of the second to fifth working examples are examples that use DTMF signals based on RFC 2833 as the instruction signals from the terminal device.

Data receiver 101 that is equivalent to receiver 11 shown in FIG. 2 analyzes received packets 100 that have been received from a terminal device (not shown) and supplies as output at least one among reception control data 102, reception image data 103, reception audio data 104, and DTMF data 116. Reception control data 102 are supplied to control module 107. Reception image data 103 are supplied to image data converter 105, which is equivalent to converter 15 shown in FIG. 2, and to switch 108. Reception audio data 104 are supplied to switch 108. DTMF data 116 are supplied to DTMF detector 106, which is equivalent to detector 16 shown in FIG. 2.

At the start of communication, control module 107 supplies to data transmitter 114, which is equivalent to transmitter 14 shown in FIG. 2, transmission control data 111 based on SIP/SDP for carrying out call connection and capability exchange between the terminal device and the moving picture storage device. Upon completion of capability exchange, control module 107 supplies to data receiver 101 the port number for the reception of reception image data 103 and reception audio data 104 and supplies to data transmitter 114 the port number for the transmission of transmission image data 112 and transmission audio data 113. In addition, control module 107 supplies to storage device 110, which is equivalent to storage unit 10 shown in FIG. 2, a guidance moving picture transmission instruction signal showing the method of operation in the terminal device. Upon receiving as input the guidance moving picture transmission instruction signal, storage device 110 supplies transmission image data 112 and transmission audio data 113 that correspond to the guidance moving picture to data transmitter 114. The guidance moving picture contains at least one among speech and an image having the content "Please press number '0' when starting recording and number '1' when ending recording."

Data transmitter 114 converts to packets at least one among transmission control data 111, transmission image data 112, and transmission audio data 113 and supplies transmission packets 115.

When the moving picture storage device is realized by a device such as a server device that includes a computer, the capability for analyzing received packets 100 in data receiver 101, the capability for converting data to packets in data transmitter 114, and image data converter 105, DTMF detector 106, and control module 107 are realized by a program and a CPU that executes processes in accordance with the program.

The terminal device transmits a start recording instruction or an end recording instruction by DTMF signals based on IETF RFC2833. Upon receiving from a terminal device a DTMF signal based on IETF RFC2833 as a start recording instruction or an end recording instruction, data receiver 101 supplies DTMF data 116 to DTMF detector 106. DTMF detector 106 analyzes DTMF data 116 that have been received as input and supplies the results of analysis as DTMF signal detection results to control module 107.

When the DTMF signal detection results indicate a start recording instruction, control module 107 supplies the start recording instruction to image data converter 105 and switch 108. When the DTMF signal detecton results indicate an end recording instruction, control module 107 supplies an end recording instruction to image data converter 105 and switch 108.

Upon input of a start recording instruction, image data converter 105 converts reception image data 103 at the time of input to image data that have been subjected to intramode coding and supplies the result to switch 108. To carry out this process, image data converter 105 constantly decodes reception image data 103 that have been received as input, and upon receiving a start recording instruction as input, subjects the decoded image to intramode coding.

At the time of input of a start recording instruction, switch 108 supplies to storage device 110 image data that have been subjected to intramode coding and supplied from image data converter 105. From the time that recording has started until the input of an end recording instruction, switch 108 continues to supply reception image data 103 to storage device 110. Switch 108 further supplies reception audio data 104 to storage device 110 from the input of a start recording instruction until the input of an end recording instruction.

Second Working Example

Figure 5:
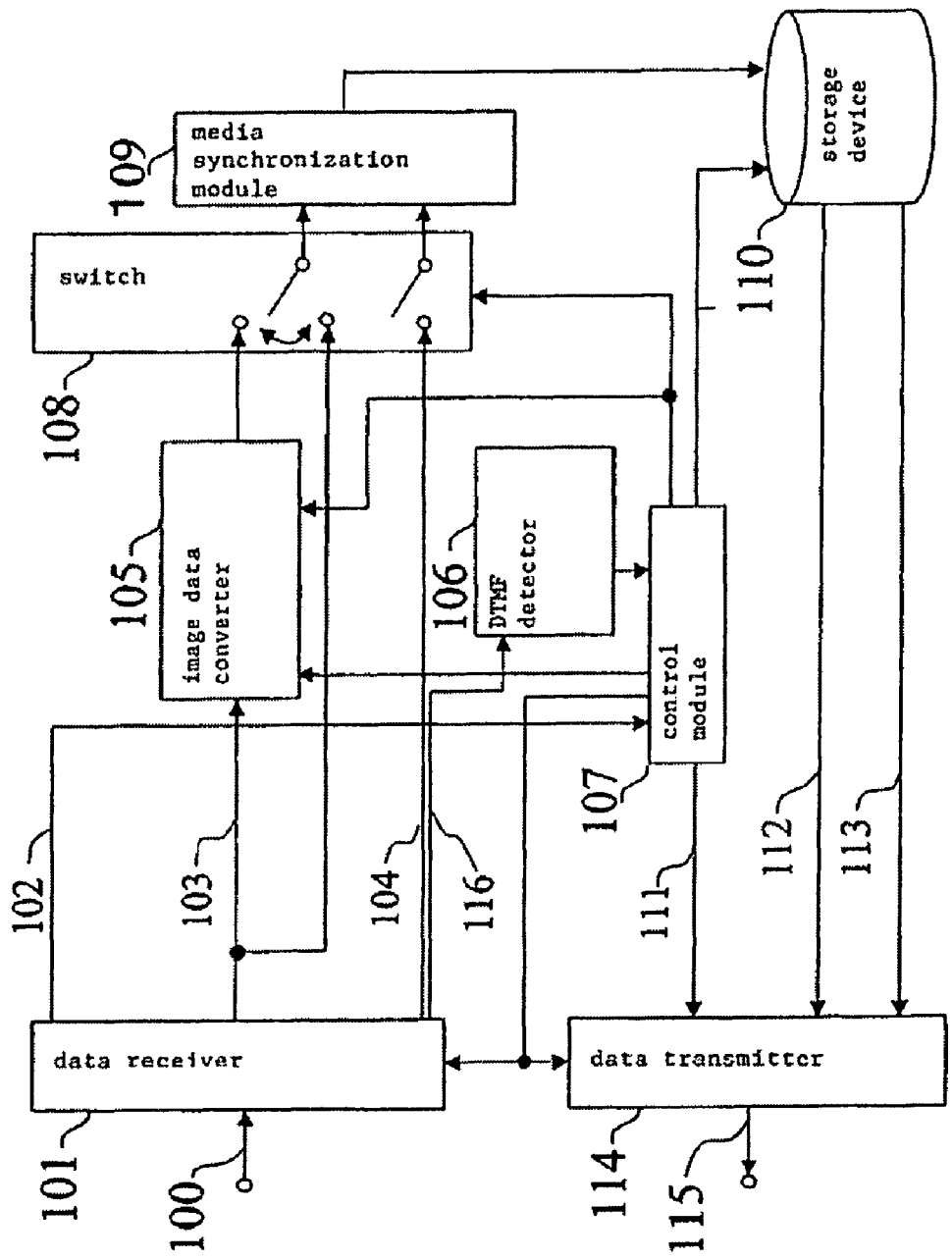
FIG. 5 is a block diagram showing the second working example of the moving picture storage system of the present invention.

Explanation next regards the second working example of the present invention with reference to FIG. 5. The present working example corresponds to the first embodiment that is used in a packet-switching network (see FIG. 2)

Data receiver 101 analyzes received packets 100 that have been received from a terminal device and supplies as output at least one among reception control data 102, reception image data 103, reception audio data 104, and DTMF data 116. Reception control data 102 are supplied to control module 107. Reception image data 103 are supplied to image data converter 105 and to switch 108. Reception audio data 104 are supplied to switch 108. DTMF data 116 are supplied to DTMF detector 106.

In order to carry out call connection and capability exchange between a terminal device and the moving picture storage device at the start of communication, control module 107 supplies data transmitter 114 with transmission control data 111 based on SIP/SOP as prescribed by IETF RFC3261/ RFC2327. Upon completion of capability exchange, control module 107 supplies data receiver 101 with the port number for receiving reception image data 103 and reception audio data 104, and transmits the port number for transmitting transmission image data 112 and transmission audio data 113 to data transmitter 114. Control module 107 further supplies storage device 110 with a guidance moving picture transmission instruction signal indicating the method of operation in the terminal device. Upon receiving the guidance moving picture transmission instruction signal as input, storage device 110 supplies transmission image data 112 and transmission audio data 113 that correspond to the guidance moving picture to data transmitter 114. The guidance moving picture contains at least one among speech and images having the content of, for example "Please press number '0' when starting recording and number '1' when ending recording."

Data transmitter 114 converts to packets at least one among transmission control data 111, transmission image data 112, and transmission audio data 113, and supplies the resulting transmission packets 115.

Upon receiving DTMF signal based on IETE RFC2833 as a start recording instruction or an end recording instruction from a terminal device, data receiver 101 supplies DTMF data 116 to DTMF detector 106. DTMF detector 106 analyzes DTMF data 116 that have been received as input and supplies the DTMF signal detection results to control module 107.

When the DTMF signal detection result indicates a start recording instruction, control module 107 supplies the start recording instruction to image data converter 105 and switch 108. When the DTMF signal detection results indicate an end recording instruction, control module 107 supplies the end recording instruction to image data converter 105 and switch 108.

Upon input of a start recording instruction, image data converter 105 converts reception image data 103 at that time to image data that have been subjected to intramode coding and supplies the result to switch 108. In order to carry out this process, image data converter 105 constantly decodes reception image data 103 that are received as input, and upon receiving a start recording instruction, subjects the decoded image to intramode coding.

At the time of input of a start recording instruction, switch 108 supplies media synchronization module 109 with image data that have undergone intramode coding and that have been supplied from image data converter 105. From the time that recording has started until the input of an end recording instruction, switch 108 continues to supply reception image data 103 to media synchronization module 109. Switch 108 supplies reception audio data 104 to media synchronization module 109 from the input of a start recording instruction until the input of an end recording instruction.

Media synchronization module 109 confers time information to audio data and image data that have undergone conversion and supplies these data to storage device 110. At this time, as a result of intramode coding, the code amount in the image data of the time that recording has started is usually greater than the code amount before conversion. Thus, when image and speech are synchronized at the time conversion starts, the display of the image is delayed.

Figure 6A:
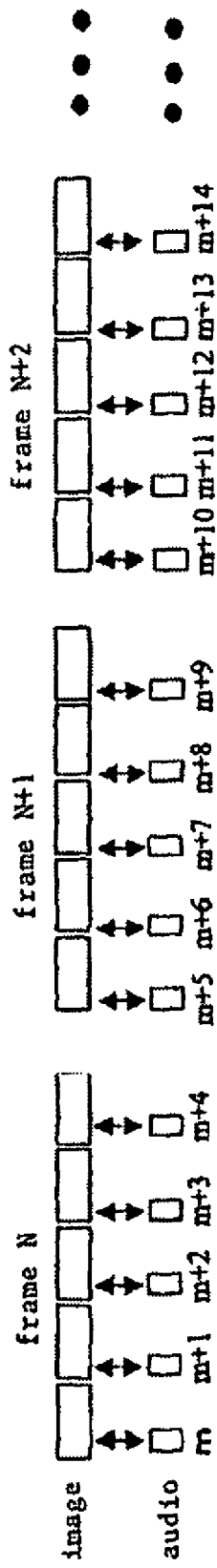
FIG. 6A is an explanatory view for explaining data synchronization adjustment in the present invention.
Figure 6B:
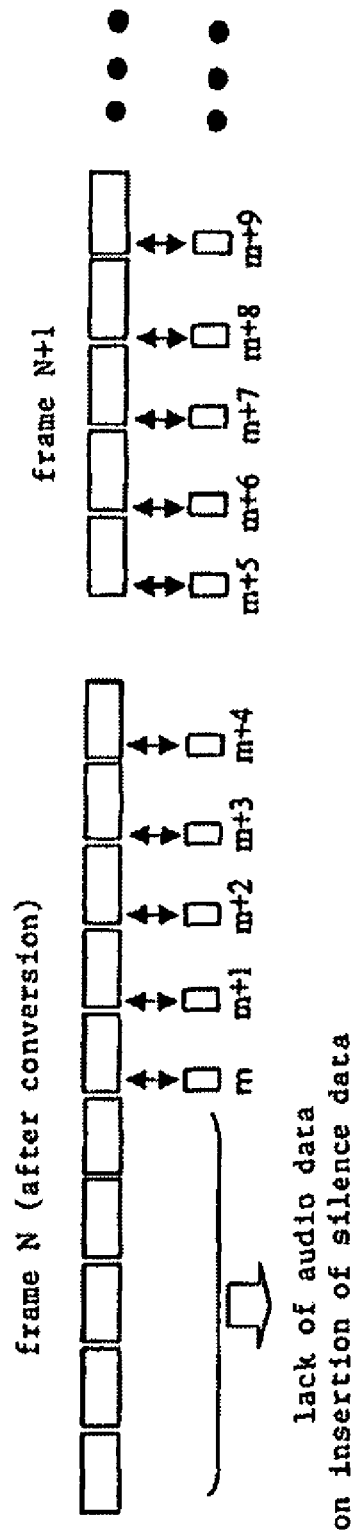
FIG. 6B is an explanatory view for explaining data synchronization adjustment in the present invention.

Media synchronization module 109 therefore adjusts by shifting audio data back as shown in frame N in FIG. 6A to obtain synchronization of image and speech. In other words, when the code amount in image data that have undergone conversion by image data converter 105 changes with respect to the code amount before conversion, media synchronization module 109 adjusts the information relating to the reproduction timing of audio data. At this time, when the lack of audio data that correspond to the leading image causes a problem at the time of reproduction, media synchronization module 109 inserts, for example, silence data to correspond with the leading image data that have undergone conversion, as shown in FIG. 6B.

Third Working Example

Figure 7:
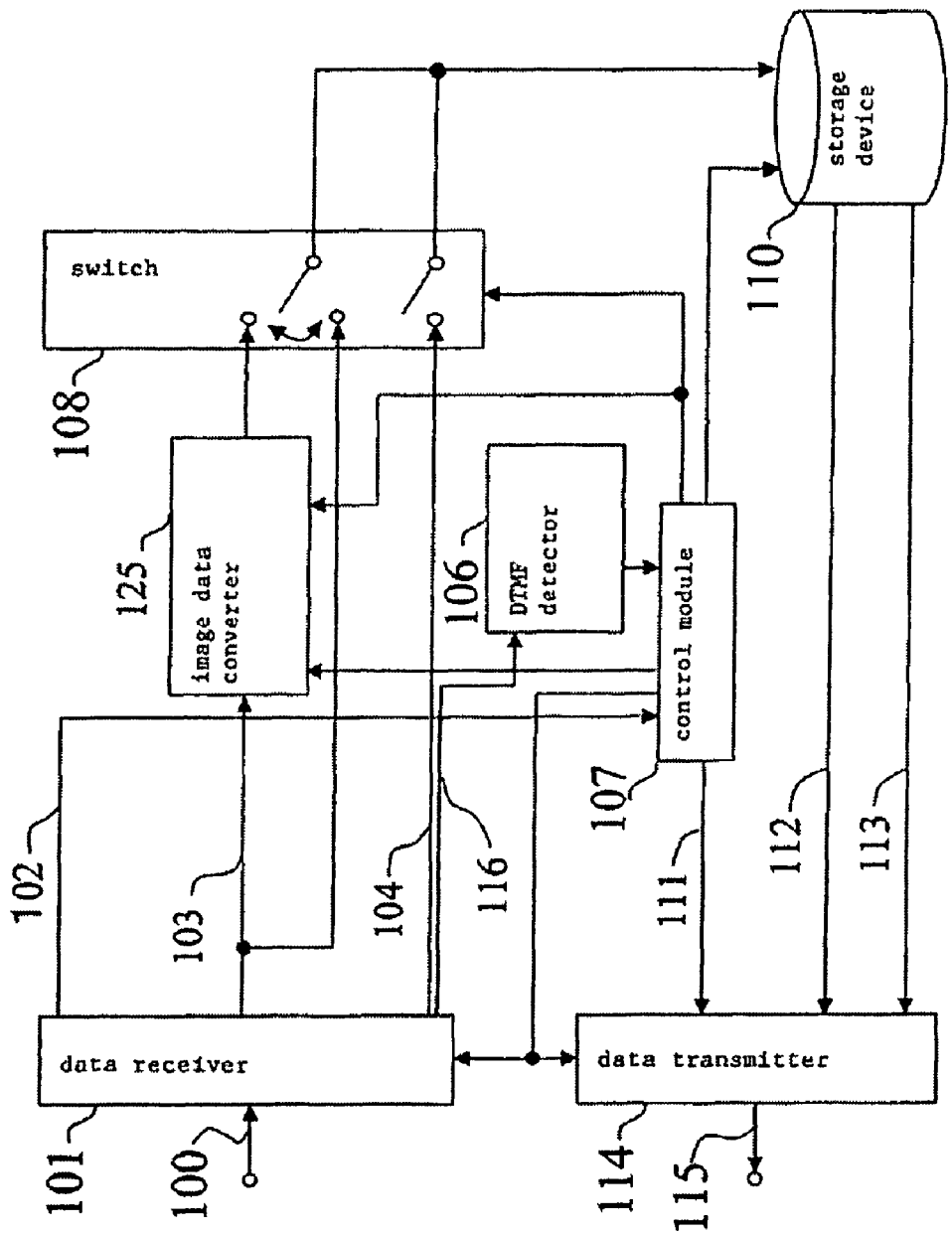
FIG. 7 is a block diagram showing the third working example of the moving picture storage system of the present invention.

Explanation next regards the third working example of the present invention with reference to FIG. 7. The present working example corresponds to the first embodiment that is used in a packet-switching network (see FIG. 2).

Data receiver 101 analyzes packets 100 received from a terminal device and supplies as output at least one among reception control data 102, reception image data 103 reception audio data 104 and DTMF data 116. Reception control data 102 are supplied to control module 107. Reception image data 103 are supplied to image data converter 125 and switch 108. Reception audio data 104 are supplied to switch 108. DTMF data 116 are supplied to DTMF detector 106.

Control module 107 supplies data transmitter 114 with transmission control data 111 based on SIP/SDP as prescribed by IETF RFC3261/RFC2327 for carrying out call connection and capability exchange between a terminal device and the moving picture storage device at the start of communication. Upon completion of capability exchange, control module 107 supplies the port number for receiving reception image data 103 and reception audio data 104 to data receiver 101, and supplies data transmitter 114 with the port number for transmitting transmission image data 112 and transmission audio data 113, Control module 107 further supplies storage device 110 with a guidance moving picture transmission instruction signal showing the method of operation in the terminal device. Upon receiving the guidance moving picture transmission instruction signal as input, storage device 110 supplies data transmitter 114 with transmission image data 112 and transmission audio data 113 that correspond to the guidance moving picture. The guidance moving picture contains, for example, at least one among speech and an image having the content "Please press number '0' when starting recording and number '1' when ending recording."

Data transmitter 114 converts at least one among transmission control data 111, transmission image data 112, and transmission audio data 113 to packets and supplies transmission packets 115.

Upon receiving DTMF signals based on IETF RFC2833 as a start recording instruction or an end recording instruction from a terminal device, data receiver 101 supplies DTMF data 116 to DTMF detector 106. DTMF detector 106 analyzes DTMF data 116 that have been received as input and supplies the detection results of the DTMF signal to control module 107.

When the DTMF signal detection results indicate a start recording instruction, control module 107 supplies a start recording instruction to image data converter 125 and switch 108. When the DTMF signal detection results indicate an end recording instruction, control module 107 supplies an end recording instruction to image data converter 125 and switch 108.

Upon receiving a start recording instruction as input, image data converter 125 converts reception image data 103 at that time to image data that have undergone intramode coding and supplies the result to switch 108. To carry out this process, image data converter 125 constantly decodes reception image data 103 that are received as input, and upon input of a start recording instruction, subjects the decoded images to intramode coding. Image data converter 125 here implements control such that the image data size after conversion becomes a predetermined target value.

Figure 8:
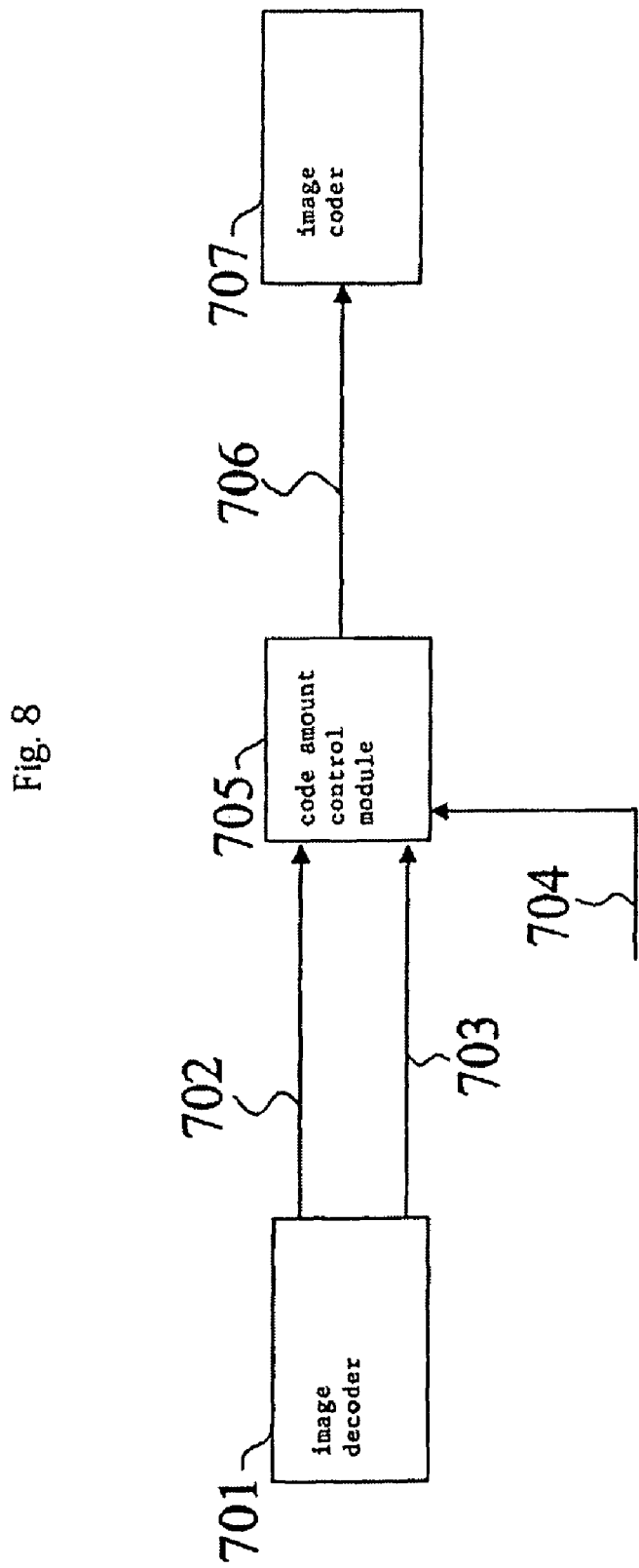
FIG. 8 is a block diagram showing an example of the configuration of the image data converter shown in FIG. 7.

FIG. 8 is a block diagram showing the configuration of image data converter 125. As shown in FIG. 8, image data converter 125 is provided with image decoder 701, code amount control module 705, and image coder 707.

Image decoder 701 supplies code amount control module 705 with: decoding time quantization accuracy 702, which is the quantization accuracy at the time of decoding that is obtained when decoding; and reception code amount 703 in frame units, macroblock units, or video packet units, which are macroblock groups, in reception image data 103 that have been subjected to MPEG-4 coding.

Code amount control module 705 uses at least one among decoding time quantization accuracy 702, reception code amount 703, and target code amount 704 to determine quantization accuracy 706 at the time of coding, and supplies the result to image coder 707. Image coder 707 carries out quantization in accordance with quantization accuracy 706 to execute image coding Decoding time quantization accuracy 702 is a parameter obtained when image decoder 701 carries out decoding, and is effective information when controlling coding such that the code amount after coding approaches target code amount 704.

For example, when reception code amount 703 is greater than target code amount 704, code amount control module 705 implements control such that coding time quantization accuracy 706 is rougher than decoding time quantization accuracy 702. When target code amount 704 is exceeded even when quantization accuracy 706 during coding is set to the roughest level, the supplied code amount can be reduced by setting to "0" several of the higher order values of the DCT coefficient during coding. Setting target code amount 704 prevents large variations in the code amount in image data that have been coded by image coder 707.

Switch 108 shown in FIG. 7 supplies storage device 110 with image data that have been subjected to intramode coding and that have been supplied from image data converter 125 at the time of input of a start recording instruction. Switch 108 continues to supply reception image data 103 to storage device 110 from the time that recording has started until the input of an end recording instruction. Switch 108 further supplies reception audio data 104 to storage device 110 from the input of a start recording instruction until the input of an end recording instruction.

Fourth Working Example

Figure 9:
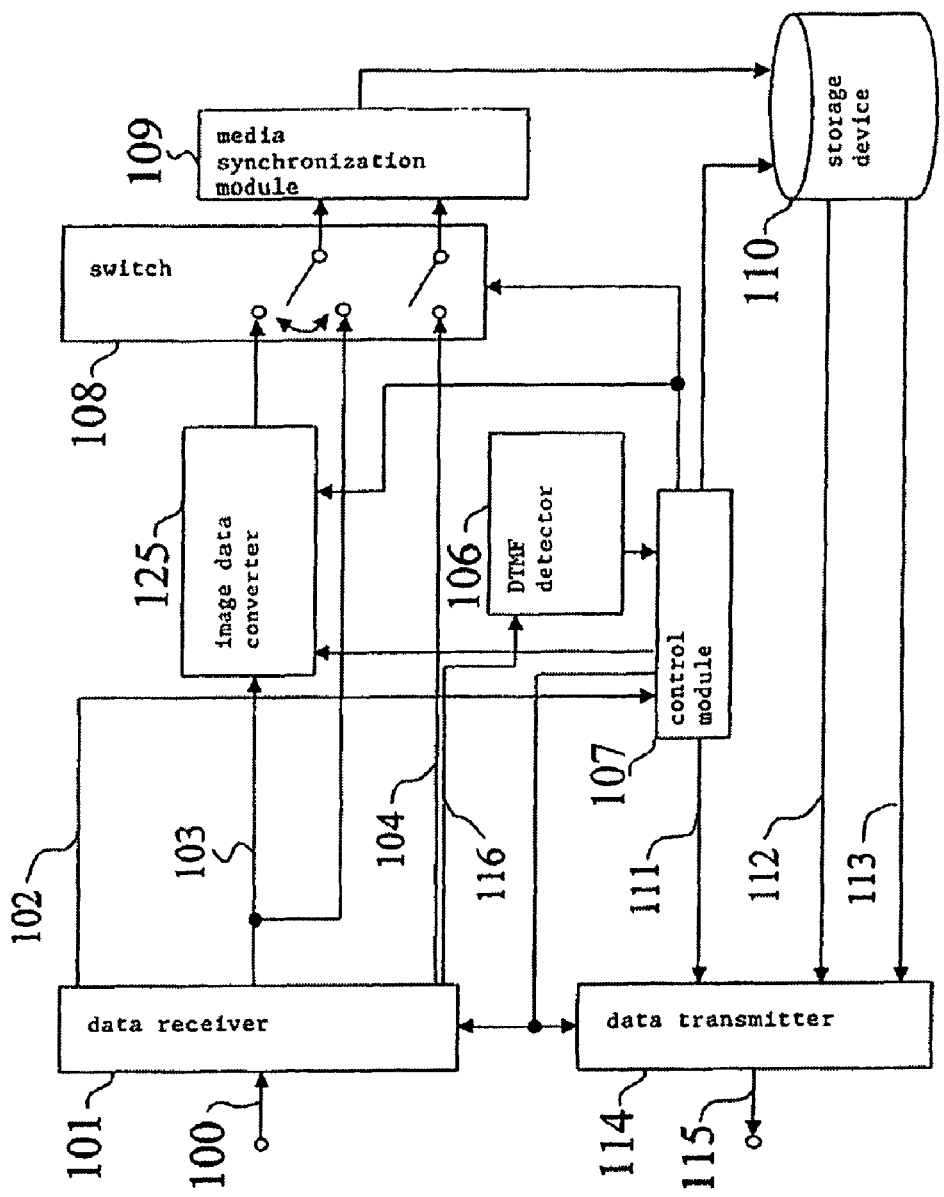
FIG. 9 is a block diagram showing an example of the configuration of the fourth working example of the moving picture storage system of the present invention.

Explanation next regards the fourth working example of the present invention with reference to FIG. 9. The present working example corresponds to the first embodiment that is used in a packet-switching network (see FIG. 2).

Data receiver 101 analyzes received packets 100 that have been received from a terminal device, and supplies as output at least one among reception control data 102, reception image data 103, reception audio data 104, and DTMF data 116. Reception control data 102 are supplied to control module 107. Reception image data 103 are supplied to image data converter 135 and switch 108. Reception audio data 104 are supplied to switch 108. DTMF data 116 are supplied to DTMF detector 106.

Control module 107 supplies data transmitter 114 with transmission control data 111 based on SIP/SDP as prescribed by IETF RFC3261/RFC2327 for carrying out call connection and capability exchange between a terminal device and the moving picture storage device at the start of communication. Upon completion of capability exchange, control module 107 supplies data receiver 101 with the port number for receiving reception image data 103 and reception audio data 104, and supplies data transmitter 114 with the port number for transmitting transmission image data 112 and transmission audio data 113. Control module 107 further supplies storage device 110 with a guidance moving picture transmission instruction signal indicating the method of operation in the terminal device. Upon receiving as input the guidance moving picture transmission instruction signal, storage device 110 supplies data transmitter 114 with transmission image data 112 and transmission audio data 113 that correspond to the guidance moving picture. The guidance moving picture contains, for example, at least one among speech and images having the content "Please press number '0' when starting recording and number '1' when ending recording,"

Data transmitter 114 converts to packets at least one among transmission control data 111, transmission image data 112, and transmission audio data 113 and supplies transmission packets 115.

Upon receiving a DTMF signal based on IETF RFC2833 as a start recording instruction or an end recording instruction from a terminal device, data receiver 101 supplies DTMF 116 to DTMF detector 106. DTMF detector 106 analyzes DTMF data 116 that have been received and supplies the DTMF signal detection results to control module 107.

When the DTMF signal detection results indicate a start recording instruction, control module 107 supplies the start recording instruction to image data converter 125 and switch 108. When the DTMF signal detection results indicate an end recording instruction, control module 107 supplies an end recording instruction to image data converter 125 and switch 108.

Upon the input of a start recording instruction, image data converter 125 converts the reception image data 103 at this time to image data that have undergone intramode coding and supplies the result to switch 108. In order to carry out this process image data converter 105 constantly decodes reception image data 103 that are received as input, and when a start recording instruction is received as input, subjects the decoded images to intramode coding.

As in the third working example, image data converter 125 is of the configuration shown in the example of FIG. 8. Image data converter 125 therefore operates similarly to the case of the third working example.

Switch 108 supplies media synchronization module 109 with image data that have undergone intramode coding and that have been supplied from image data converter 105 at the time of input of a start recording instruction. Switch 108 continues to supply media synchronization module 109 with reception image data 103 from the time that recording has started until the input of an end recording instruction. Switch 108 further supplies media synchronization module 109 with reception audio data 104 from the input of the start recording instruction and until the input of an end recording instruction.

Media synchronization module 109 confers time information to the audio data and the image data that have undergone conversion and supplies these data to storage device 110. At this time, the code amount in image data of the time that recording has started, having undergone intramode coding, is usually greater than the code amount in the image data before conversion. As a result, if image and speech are synchronized at the start of conversion, the image will be displayed with a delay.

Media synchronization module 109 therefore adjusts by shifting audio data back as shown in frame N in FIG. 6A such that synchronization is established between the image and speech. At this time, if the lack of audio data that correspond to the leading image raises problems when reproducing, media synchronization module 109 inserts, for example, silence data as shown in FIG. 6B.

Fifth Working Example

Figure 10:
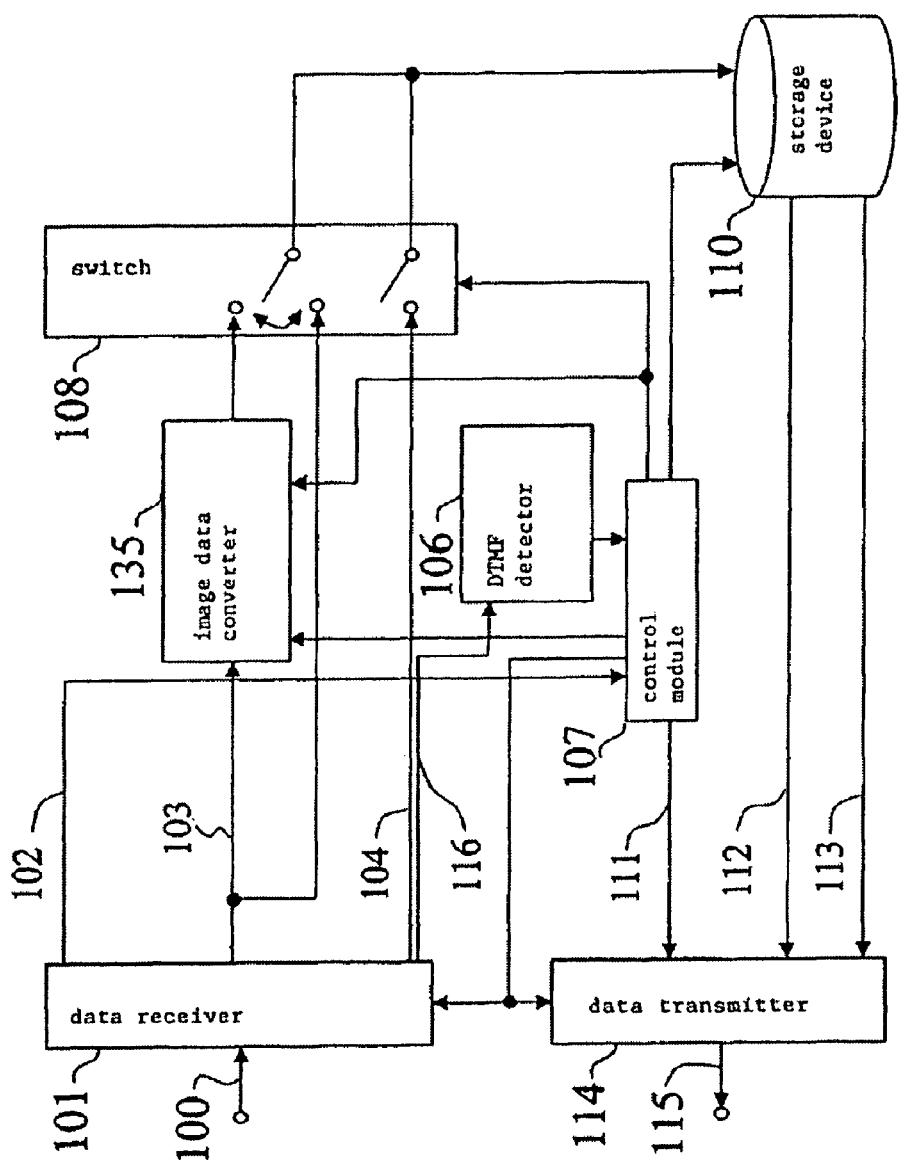
FIG. 10 is a block diagram showing the fifth working example of the moving picture storage system of the present invention.

Explanation next regards the fifth working example with reference to FIG. 10. The present working example corresponds to the first embodiment that is used in a packet-switching network (see FIG. 2).

Data receiver 101 analyzes received packets 100 that are received from a terminal device, and supplies as output at least one among reception control data 102, reception image data 103, reception audio data 104, and DTMF data 116. Reception control data 102 are supplied to control module 107. Reception image data 103 are supplied to image data converter 135 and switch 108. Reception audio data 104 are supplied to switch 108. DTMF data 116 are supplied to DTMF detector 106.

In order to carry out call connection and capability exchange between the terminal device and the moving picture storage device at the start of communication, control module 107 supplies data transmitter 114 with transmission control data 111 based on SIP/SDP as prescribed by IETF RFC3261/ RFC2327. Upon completion of capability exchange, control module 107 supplies data receiver 101 with the port number for receiving reception image data 103 and reception audio data 104, and supplies data transmitter 114 with the port number for transmitting transmission image data 112 and transmission audio data 113. Control module 107 further supplies storage device 110 with a guidance moving picture transmission instruction signal indicating the method of operation in the terminal device. Upon receiving the guidance moving picture transmission instruction signal, storage device 110 supplies data transmitter 114 with transmission image data 112 and transmission audio data 113 that correspond to the guidance moving picture. The guidance moving picture contains, for example, at least one among speech and images having the content "Please press number '0' when starting recording and number '1' when ending recording."

Data transmitter 114 converts at least one among transmission control data 111, transmission image data 112, and transmission audio data 113 to packets and then supplies transmission packets 115.

Upon receiving a DTMF signal based on IETF RFC2833 indicating a start recording instruction or an end recording instruction from a terminal device, data receiver 101 supplies DTMF data 116 to DTMF detector 106. DTMF detector 106 analyzes DTMF data 116 and then supplies the DTMF signal detection results to control module 107.

When the DTMF signal detection results indicate a start recording instruction, control module 107 supplies a start recording instruction to image data converter 135 and switch 108. When the DTMF signal detection results indicate an end recording instruction, control module 107 supplies the end recording instruction to image data converter 135 and switch 108.

Upon receiving the start recording instruction as input, image data converter 135 converts reception image data 103 at that time to image data that have undergone intramode coding, and supplies the result to switch 108. In order to carry out this process, image data converter 135 constantly decodes reception image data 103 that have been received as input, and when a start recording instruction is received, subjects the decoded images to intramode coding. Here, image data converter 135 implements control such that the image data size after conversion is the same as the code amount in the received image data.

Figure 11:
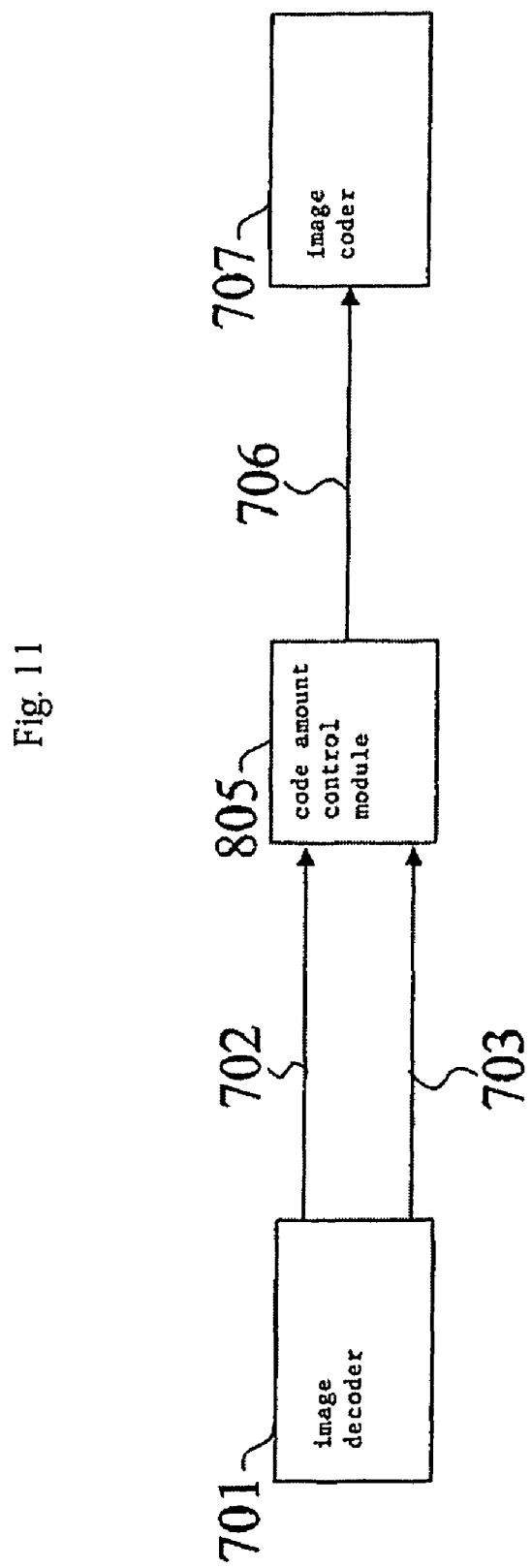
FIG. 11 is a block diagram showing an example of the configuration of the image data converter shown in FIG. 10.

FIG. 11 is a block diagram showing the configuration of image data converter 135. As shown in FIG. 11, image data converter 135 is provided with: image decoder 701, code amount control module 805 and image coder 707.

Image decoder 701 supplies code amount control module 805 with decoding time quantization accuracy 702 and reception code amount 703 in frame units, macroblock units, or video packet units, which are macroblock groups in reception image data 103 that have undergone MPEG-4 coding. Decoding time quantization accuracy 702 is a parameter obtained when image decoder 701 carries out decoding, and is information that is effective when implementing control of coding such that the code amount after coding approaches reception code amount 703.

Code amount control module 805 uses at least one among decoding time quantization accuracy 702 and reception code amount 703 to determine coding time quantization accuracy 706, and supplies the result to image coder 707. Code amount control module 805 determines quantization accuracy 706 such that the code amount after conversion (the code amount when image coder 707 has carried out coding) is the same code amount (allowing a certain amount of error) as the code amount before conversion (the code amount before image decoder 701 carries out decoding). By means of this control, synchronization is established between images and speech.

Switch 108 shown in FIG. 10 supplies storage device 110 with image data that have undergone intramode coding and that have been supplied from image data converter 135 at the time of input of a start recording instruction. From the time that recording has started until the input of an end recording instruction, switch 108 continues to supply storage device 110 with reception image data 103. In addition, switch 108 supplies storage device 110 with reception audio data 104 from the input of a start recording instruction until the input of an end recording instruction.

Sixth Working Example

Figure 12:
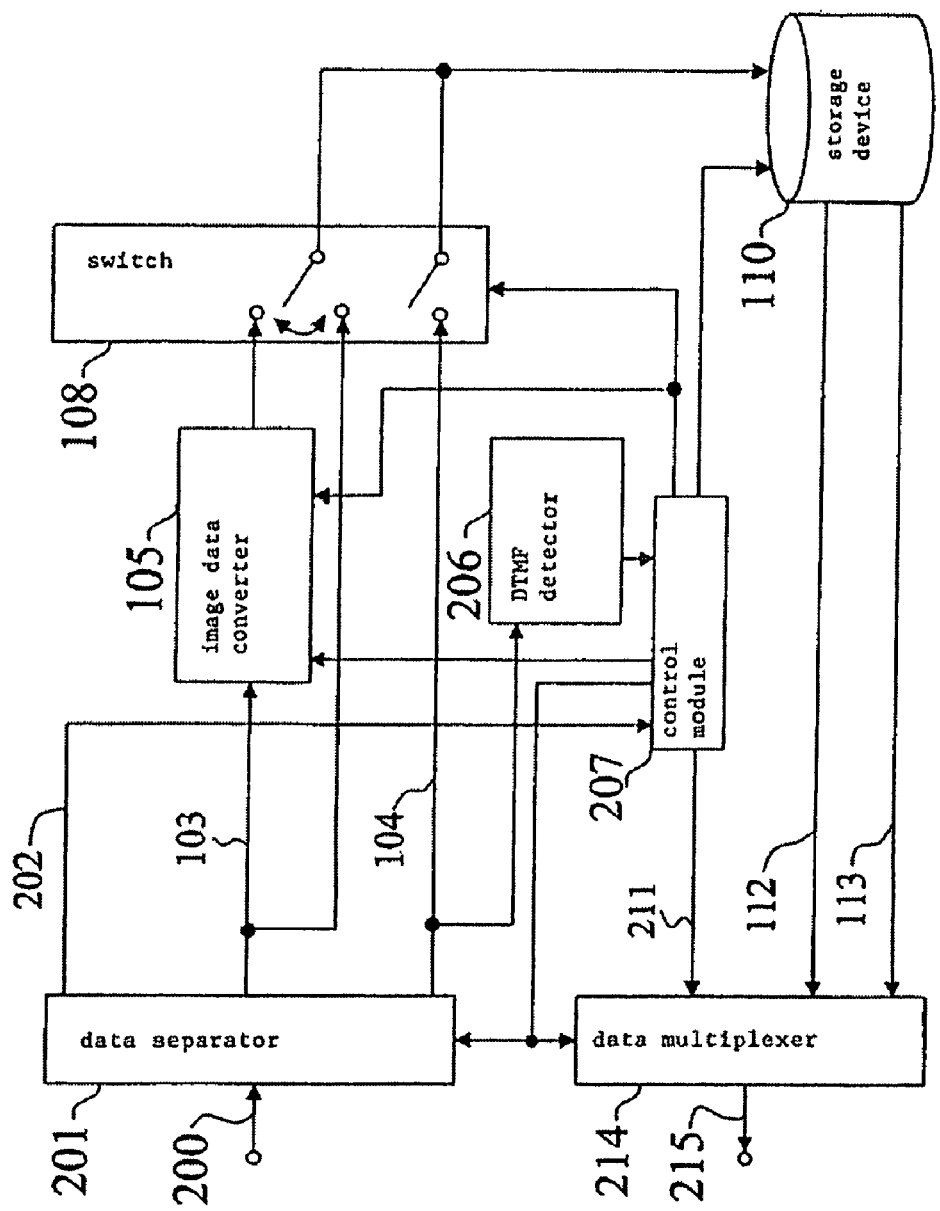
FIG. 12 is a block diagram showing the sixth working example of the moving picture storage system of the present invention.

Explanation next regards the sixth working example of the present invention with reference to FIG. 12. The present working example corresponds to the second embodiment that is used in a line-switching network (see FIG. 3). The present working example and the seventh to tenth working examples regard cases in which DTMF signals are used as instruction signals from terminal devices.

Data separator 201 that corresponds to receiver 21 shown in FIG. 3 separates at least one among reception control data 202, reception image data 103, and reception audio data 104 from reception multiplexed data 200 that have been multiplexed and received from a terminal device. Reception control data 202 are supplied to control module 207. Reception image data 103 are supplied to image data converter 105 that corresponds to converter 15 shown in FIG. 3 and to switch 108. Reception audio data 104 are supplied to DTMF detector 206 that corresponds to detector 16 shown in FIG. 3 and to switch 108.

In order to carry out capability exchange between a terminal device and a moving picture storage device at the start of communications control module 207 supplies data multiplexer 214 that corresponds to transmitter 24 shown in FIG. 3 with transmission control data 211 based on H.245 prescribed by ITU-T and supplies data separator 201 and data multiplexer 214 with capability information relating to multiplexing (multiplexing table and the maximum values of parameters used in multiple AL-SDU size multiplexing and separation) that is contained in reception control data 202. Based on this capability information, data separator 201 carries out separation of reception multiplexed data 200. Data multiplexer 214 multiplexes at least one among transmission control data 211, transmission image data 112, and transmission audio data 113.

When the moving picture storage device is realized by a device such as a server device that includes a computer, the capability for separating data in data separator 201, the capability for multiplexing data in data multiplexer 214, and image data converter 105, DTMF detector 206, and control module 207 are each realized by a program and a CPU that executes processes in accordance with the program.

Upon completion of the capability exchange, control module 207 supplies storage device 110, which corresponds to storage device 10 shown in FIG. 3, with a guidance moving picture transmission instruction signal that indicates the method of operation in the terminal device. Upon receiving the guidance moving picture transmission instruction signal as input, storage device 110 supplies data multiplexer 214 with transmission image data 112 and transmission audio data 113 that correspond to the guidance moving picture. The guidance moving picture contains, for example, at least one among speech and images having the content "Please press number '0' when starting recording and number '1' when ending recording."

Data multiplexer 214 multiplexes at least one among transmission control data 211, transmission image data 112, and transmission audio data 113 and supplies transmission multiplexed data 215.

When a start recording instruction or an end recording instruction is transmitted from a terminal device, DTMF detector 206 detects a DTMF signal by analyzing the frequency of the audio signal obtained from reception audio data 104 and supplies the DTMF signal detection results to control module 207.

When the DTMF signal detection results indicate a start recording instruction, control module 207 supplies the start recording instruction to image data converter 105 and switch 108. When the DTMF signal detection results indicate an end recording instruction, control module 207 supplies the end recording instruction to image data converter 105 and switch 108.

Upon input of a start recording instruction, image data converter 105 converts reception image data 103 at that time to image data that have undergone intramode coding and supplies the result to switch 108. To carry out this process, image data converter 105 constantly decodes reception image data 103 that are received as input, and upon input of a start recording instruction, subjects the decoded image to intramode coding.

Switch 108 supplies storage device 110 with image data that have undergone intramode coding and that have been supplied from image data converter 105 at the time of input of the start recording instruction. Switch 108 continues to supply storage device 110 with reception image data 103 from the time that recording has started until the input of an end recording instruction. Switch 108 further supplies storage device 110 with reception audio data 104 from the input of a start recording instruction until the input of an end recording instruction.

Seventh Working Example

Figure 13:
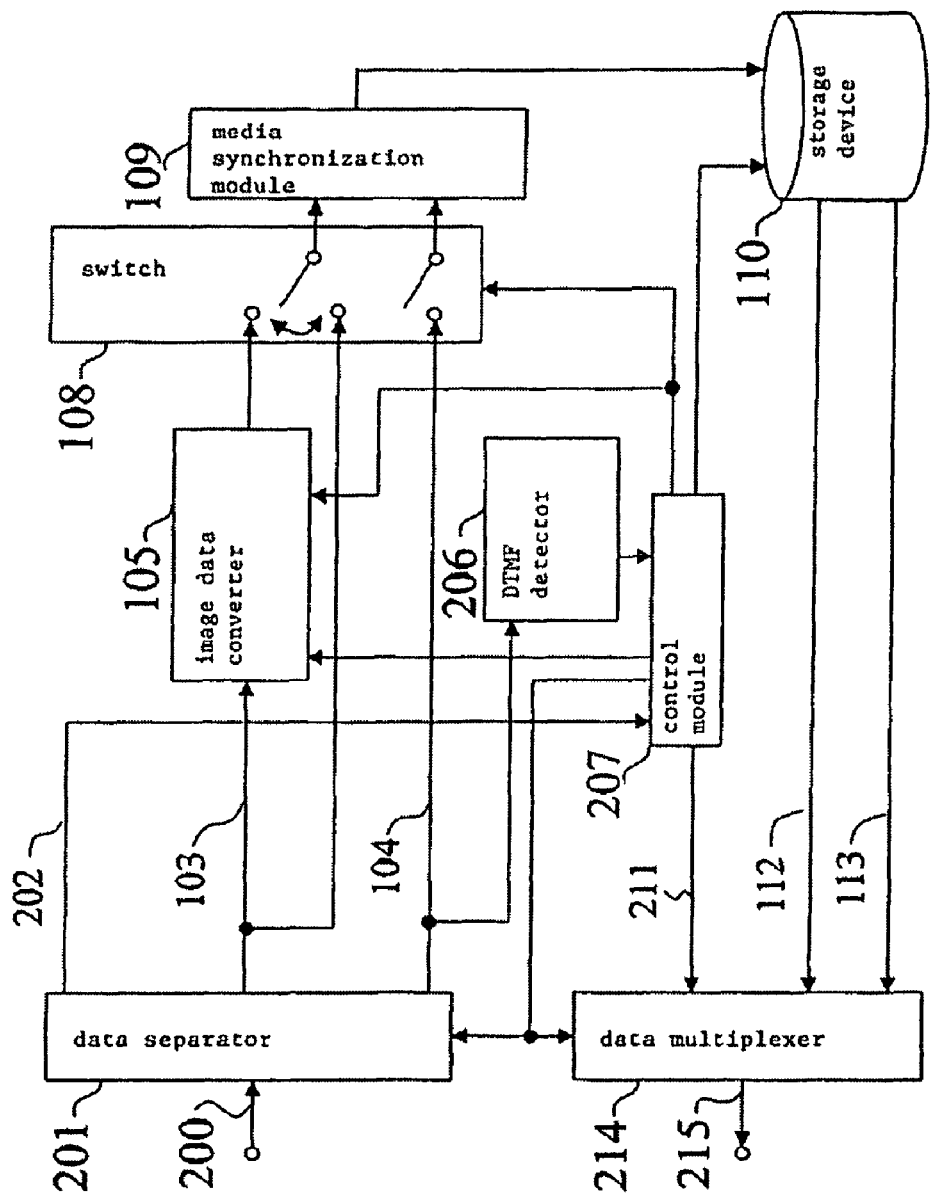
FIG. 13 is a block diagram showing the seventh working example of the moving picture storage system of the present invention.

Explanation next regards the seventh working example of the present invention with reference to FIG. 13. The present working example corresponds to the second embodiment that is used in a line-switching network (see FIG. 3).

Data separator 201 separates at least one among reception control data 202, reception image data 103, and reception audio data 104 from reception multiplexed data 200 that have been multiplexed and received from a terminal device. Reception control data 202 are supplied to control module 207. Reception image data 103 are supplied to image data converter 105 and switch 108. Reception audio data 104 are supplied to DTMF detector 206 and switch 108.

In order to carry out capability exchange between the terminal device and the moving picture storage device at the start of communication, control module 207 supplies data multiplexer 214 with transmission control data 211 based on H.245 which is prescribed by ITU-T, and supplies data separator 201 and data multiplexer 214 with capability information relating to multiplexing and that is contained in reception control data 202 (such as multiplexing tables and the maximum values of parameters used during multiple AL-SDU size multiplexing, and separation). Based on this capability information, data separator 201 separates reception multiplexed data 200. Data multiplexer 214 multiplexes at least one among transmission control data 211, transmission image data 112, and transmission audio data 113.

Upon completion of capability exchange, control module 207 supplies storage device 110 with a guidance moving picture transmission instruction signal that indicates the method of operation in the terminal device. When the guidance moving picture transmission instruction signal is received as input, storage device 110 supplies data multiplexer 214 with transmission image data 112 and transmission audio data 113 that correspond to the received guidance moving picture. The guidance moving picture includes, for example, at least one among speech and images having the content "Please press number '0' when starting recording and number '1' when ending recording."

Data multiplexer 214 multiplexes at least one among transmission control data 211, transmission image data 112, and transmission audio data 113 and then supplies transmission multiplexed data 215.

When a start recording instruction or an end recording instruction is transmitted from terminal device, DTMF detector 206 analyzes the frequency of the audio signal obtained from reception audio data 104 to detect DTMF signals, and supplies the DTMF signal detection results to control module 207.

When the DTMF signal detection results indicate a start recording instruction, control module 207 supplies the start recording instruction to image data converter 105 and switch 108, When the DTMF signal detection results indicate an end recording instruction, control module 207 supplies the end recording instruction to image data converter 105 and switch 108.

Upon receiving a start recording instruction as input, image data converter 105 converts reception image data 103 at this time to image data that have undergone intramode coding and supplies the result to switch 108. In order to carry out this process, image data converter 105 constantly decodes reception image data 103 that are received as input, and when a start recording instruction is received as input, subjects the decoded image to intramode coding.

Switch 108 supplies media synchronization module 109 with image data that have undergone intramode coding and that have been supplied from image data converter 105 at the time of input of a start recording instruction. Switch 108 continues to supply media synchronization module 109 with reception image data 103 from the time that recording has started until the input of an end recording instruction.

Media synchronization module 109 confers time information to audio data and image data that have undergone conversion and supplies these data to storage device 110. At this time, the code amount in image data when starting recording, having undergone intramode coding, is usually greater than the code amount before conversion. In this case, synchronizing images and speech at the time conversion is started results in the delayed display of images.

In response, media synchronization module 109 adjusts by shifting audio data back as shown in frame N in FIG. 6A such that synchronization is established between images and speech. At this time, when the lack of audio data for the leading image causes problems during reproduction, media synchronization module 109 inserts, for example, silence data as shown in FIG. 5B.

Eighth Working Example

Figure 14:
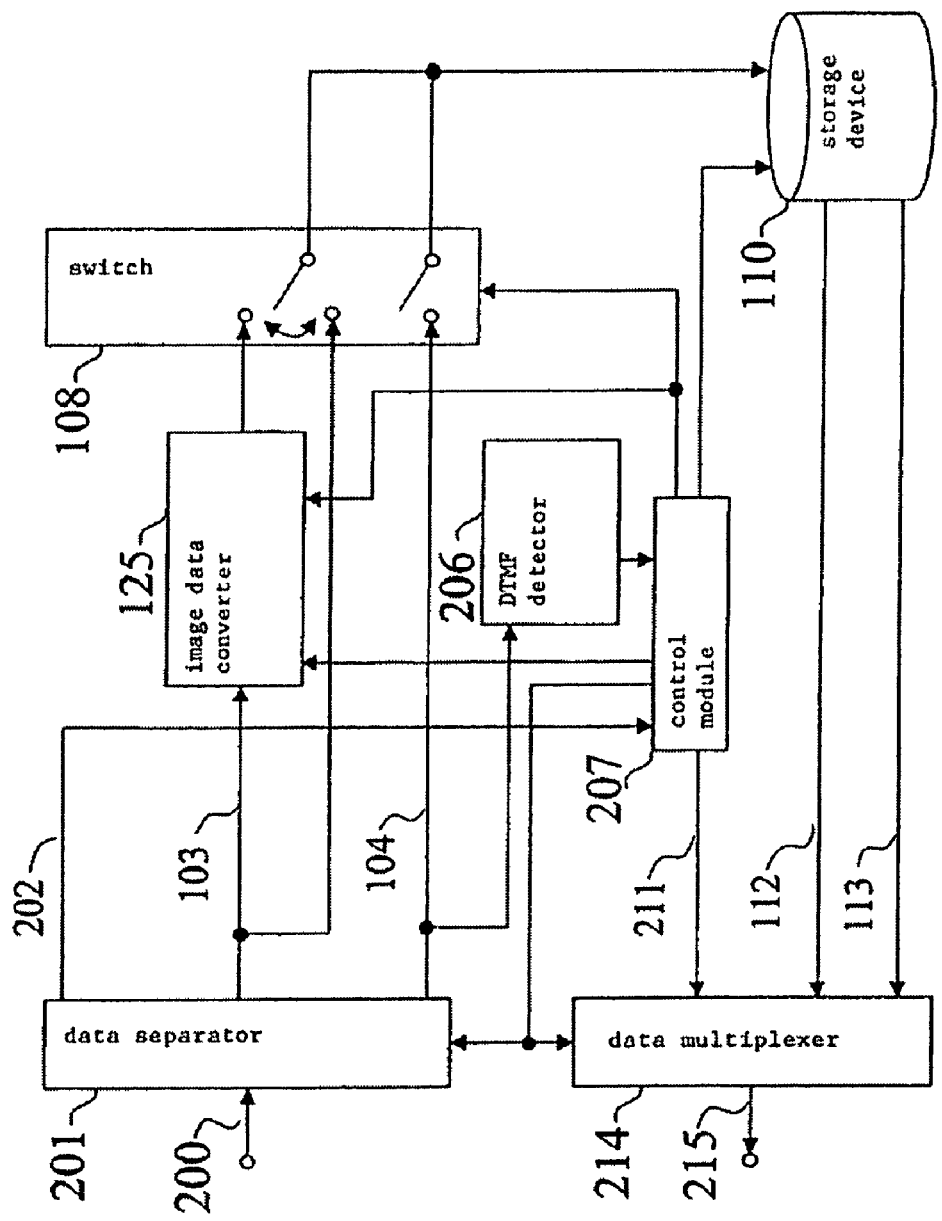
FIG. 14 is a block diagram showing the eighth working example of the moving picture storage system of the present invention.

Explanation next regards the eighth working example of the present invention with reference to FIG. 14. The present working example corresponds to the second embodiment used in a line-switching network (see FIG. 3).

Data separator 201 separates at least one among reception control data 202, reception image data 103, and reception audio data 104 from reception multiplexed data that have been multiplexed and received from a terminal device.

Reception control data 202 are supplied to control module 207. Reception image data 103 are supplied to image data converter 125 and switch 108. Reception audio data 104 are supplied to DTMF detector 206 and switch 108.

In order to carry out capability exchange between the terminal device and the moving picture storage device at the start of communication, control module 207 supplies data multiplexer 214 with transmission control data 211 based on H.245 as prescribed by ITU-T, and supplies data separator 201 and data multiplexer 214 with capability information relating to multiplexing and that is contained in reception control data 202 (multiplexing tables and the maximum values of parameters used during multiple AL-SDU size multiplexing and separation). Based on this capability information, data separator 201 carries out separation of reception multiplexed data 200. Data multiplexer 214 multiplexes at least one among transmission control data 211, transmission image data 112, and transmission audio data 113.

Upon completion of capability exchange, control module 207 supplies storage device 110 with a guidance moving picture transmission instruction signal indicating the method of operation in the terminal device. Upon input of the guidance moving picture transmission instruction signal, storage device 110 supplies data multiplexer 214 with transmission image data 112 and transmission audio data 113 that correspond to the guidance moving picture. The guidance moving picture contains, for example, at least one among speech and images having the content "Please press number '0' when starting recording or number '1' when ending recording."

Data multiplexer 214 multiplexes at least one among transmission control data 211, transmission image data 112, and transmission audio data 113 and supplies transmission multiplexed data 215 as output.

When a start recording instruction or end recording instruction is transmitted from the terminal device, DTMF detector 206 analyzes the frequency of the audio signal obtained from reception audio data 104 to detect the DTMF signal, and then supplies the DTMF signal detection results to control module 207.

When the DTMF signal detection results indicate a start recording instruction, control module 207 supplies the start recording instruction to image data converter 125 and switch 108. When the DTMF signal detection results indicate an end recording instruction, control module 207 supplies the end recording instruction to image data converter 125 and switch 108.

Upon input of a start recording instruction, image data converter 125 converts reception image data 103 at that time to image data that have undergone intramode coding and supplies the result to switch 108. In order to carry out this process, image data converter 125 constantly decodes reception image data 103 that are received as input, and upon input of a start recording instruction, subjects the decoded images to intramode coding.

As in the third working example, image data converter 125 is of the configuration shown in FIG. 8, and the operation of image data converter 125 is therefore similar to that of the third working example.

Switch 108 supplies storage device 110 with image data that have undergone intramode coding and that have been supplied from image data converter 125 at the time of input of the start recording instruction. Switch 108 continues to supply storage device 110 with reception image data 103 from the time that recording has started until the input of an end recording instruction. Switch 108 further supplies storage device 110 with reception audio data 104 from the input of a start recording instruction until the input of an end recording instruction.

Ninth Working Example

Figure 15:
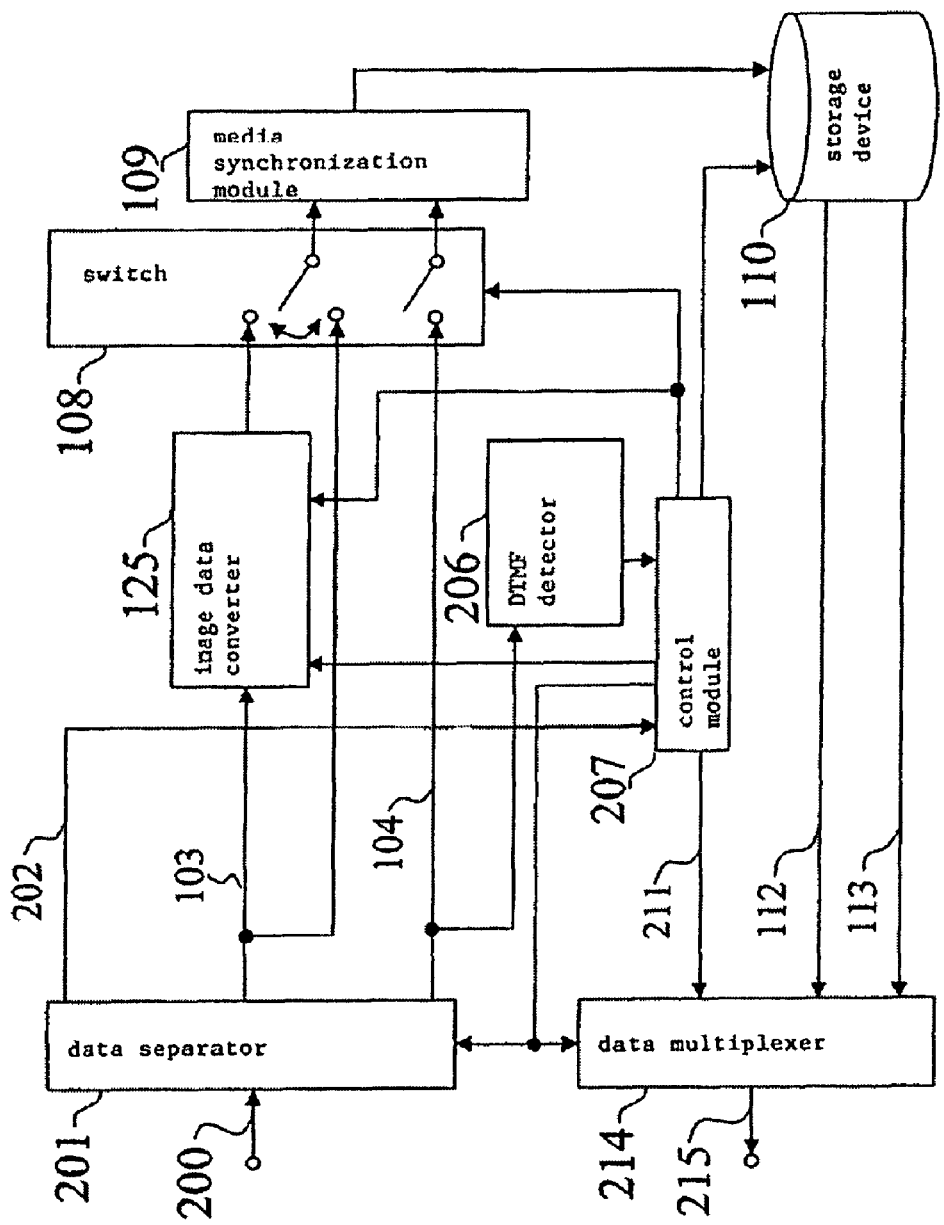
FIG. 15 is a block diagram showing the ninth working example of the moving picture storage system of the present invention.

Explanation next regards the ninth working example of the present invention with reference to FIG. 15. The present working example corresponds to the second embodiment that is used in a line-switching network (see FIG. 3).

Data separator 201 separates at least one among reception control data 202, reception image data 103, and reception audio data 104 from reception multiplexed data 200 that have been multiplexed and received from a terminal device. Reception control data 202 are supplied to control module 207. Reception image data 103 are supplied to image data converter 125 and switch 108. Reception audio data 104 are supplied to DTMF detector 206 and switch 108.

In order to carry out capability exchange between the terminal device and the moving picture storage device at the start of communication, control module 207 supplies data multiplexer 214 with transmission control data 211 based on H.245 as prescribed by ITU-T and supplies data separator 201 and data multiplexer 214 with capability information relating to multiplexing that is contained in reception control data 202 (multiplexing tables and the maximum values of parameters used during multiple AL-SDU size multiplexing and separation). Based on this capability information, data separator 201 separates reception multiplexed data 200. Data multiplexer 214 multiplexes at least one among transmission control data 211, transmission image data 112, and transmission audio data 113.

Upon completion of capability exchange, control module 207 supplies storage device 110 with a guidance moving picture transmission instruction signal indicating the method of operation in the terminal device. Upon receiving the guidance moving picture transmission instruction signal, storage device 110 supplies data multiplexer 214 with transmission image data 112 and transmission audio data 113 that correspond to the guidance moving picture. The guidance moving picture contains, for example, at least one among speech and images having the content "Please press number '0' when starting recording and number '1' when ending recording."

Data multiplexer 214 multiplexes at least one among transmission control data 211, transmission image data 112, and transmission audio data 113 and supplies transmission multiplexed data 215 as output.

When a start recording instruction or an end recording instruction is transmitted from a terminal device, DTMF detector 206 analyzes the frequency of the audio signal obtained from reception audio data 104 to detect a DTMF signal and supplies the DTMF signal detection results to control module 207.

When the DTMF signal detection results indicate a start recording instruction, control module 207 supplies the start recording instruction to image data converter 125 and switch 108. When the DTMF signal detection results indicate an end recording instruction, control module 207 supplies the end recording instruction to image data converter 125 and switch 108.

Upon receiving a start recording instruction as input, image data converter 125 converts reception image data 103 at that time to image data that have undergone intramode coding and supplies the result to switch 108. In order to carry out this process, image data converter 105 constantly decodes image data 103 that are received as input, and upon receiving a start recording instruction as input, subjects the decoded images to intramode coding.

As with the third working example, image data converter 125 is of the configuration shown in FIG. 8, and image data converter 125 therefore has the same operation as in the third working example.

Switch 108 supplies storage device 110 with image data that have undergone intramode coding and that have been supplied from image data converter 125 at the time of input of a start recording instruction. Switch 108 continues to supply storage device 110 with reception image data 103 from the time that recording has started until the input of an end recording instruction. Switch 108 further supplies media synchronization module 109 with reception audio data 104 from the input of a start recording instruction until the input of an end recording instruction.

Media synchronization module 109 confers time information to audio data and image data that have undergone conversion and supplies these data to storage device 110. At this time, the code amount in image data of the time that recording has started, having undergone intramode coding, is usually greater than the code amount before conversion. As a result, when speech and images are synchronized at the time that conversion has started, the display of images is delayed.

Media synchronization module 109 therefore adjusts by shifting audio data back as shown in frame N in FIG. 5A such that synchronization is obtained between images and speech. At this time, if the lack of audio data corresponding to the leading images causes problems during reproduction, media synchronization module 109 inserts, for example, silence data as shown in FIG. 6B.

Tenth Working Example

Figure 16:
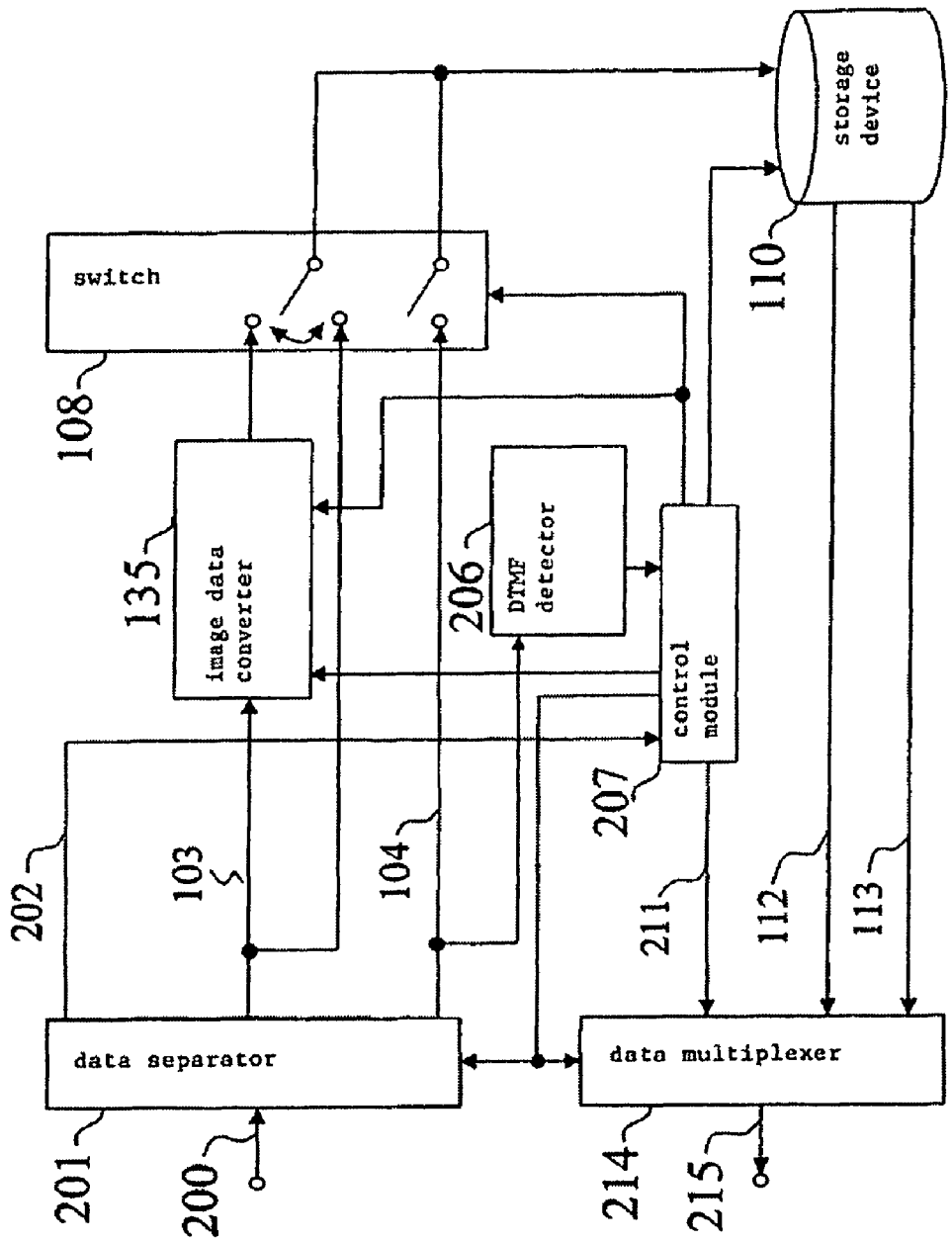
FIG. 16 is a block diagram showing the tenth working example of the moving picture storage system of the present invention.

Explanation next regards the tenth working example of the present invention with reference to FIG. 16. The present working example corresponds to the second embodiment that is used in a line-switching network (see FIG. 3).

Data separator 201 separates at least one among reception control data 202, reception image data 103, and reception audio data 104 from reception multiplexed data 200 that have been multiplexed and received from a terminal device. Reception control data 202 are supplied to control module 207. Reception image data 103 are supplied to image data converter 135 and switch 108. Reception audio data 104 are supplied to DTMF detector 206 and switch 108.

In order to carry out capability exchange between a terminal device and the moving picture storage device at the start of communication, control module 207 supplies data multiplexer 214 with transmission control data 211 based on H.245 as prescribed by ITU-T and supplies data separator 201 and data multiplexer 214 with capability information relating to multiplexing that is contained in reception control data 202 (multiplexing tables and the maximum values of parameters used during multiple AL-SDU size multiplexing and separation). Based on this capability information, data separator 201 carries out separation of reception multiplexed data 200. Data multiplexer 214 multiplexes at least one among transmission control data 211, transmission image data 112, and transmission audio data 113.

Upon completion of capability exchange, control module 207 supplies storage device 110 with a guidance moving picture transmission instruction signal indicating the method of operation in the terminal device. Upon receiving the guidance moving picture transmission instruction signal as input, storage device 110 supplies data multiplexer 214 with transmission image data 112 and transmission audio data 113 that correspond to the guidance moving picture. The guidance moving picture contains, for example, at least one among speech and images having the content "Please press number '0' when starting recording and number '1' when ending recording."

As in the case of the fifth working example, image data converter 135 implements control such that the size of image data after conversion is the same as the code amount in the received image data. In other words, image data converter 135 is of the configuration shown in FIG. 11, as with the case of the fifth working example, and image data converter 135 therefore has an operation similar to the case of the fifth working example.

Switch 108 supplies storage device 110 with image data that have undergone intramode coding and that have been supplied from image data converter 135 at the time of input of a start recording instruction. Switch 108 continues to supply storage device 110 with reception image data 103 from the time that recording has started until the input of an end recording instruction. Switch 108 further supplies storage device 110 with reception audio data 104 from the input of a start recording instruction until the input of an end recording instruction.

Potential for Use in Industry

The present invention is ideally applied for storing moving picture data that are received from a terminal device in a server, such as when storing and distributing moving picture data that are received from a videophone service or that are received from a moving picture distribution service that uses portable terminals in a line-switching network or packet-switching network.

What is claimed is:

1. A moving picture storage system for storing moving pictures that have been received from a terminal device, said moving picture storage system comprising:
   a receiver that receives and supplies as output a signal that contains at least one among audio data and image data from said terminal device;
   a transmitter that, when storing at least one among audio data and image data that have been supplied from said receiver, transmitting to said terminal device image, speech, or image and speech as guidance of the method for notifying the start of storage;
   a detector that detects a notification signal that has been transmitted from said terminal device;
   a converter that uses detection results from said detector to convert image data of the time that storage has started to intramode; and
   a synchronizing module for synchronization between audio data and image data to shift the audio data back by adjusting the information related to a reproduction timing of the audio data depending on an increase in an amount of the image data after conversion.

2. The moving picture storage system according to claim 1, wherein said receiver receives at least one among audio data and image data from said terminal device.

3. The moving picture storage system according to claim 1, wherein said receiver separates at least one among audio data and image data from a signal received from said terminal device.

4. The moving picture storage system according to claims 1, further comprising a control module that implements control such that the code amount in intramode image data attains a predetermined value.

5. The moving picture storage system according to claims 1, further comprising a control module that controls the amount of intramode coding such that the code amount after conversion by said converter equals the code amount before conversion.

6. The moving picture storage system according to claims 1, wherein said detector detects a DTMF signal that is transmitted as a communication signal from said terminal device.

7. A moving picture storage method for storing moving pictures that have been received from a terminal device, said moving picture storage method comprising:
   a reception step for receiving and supplying as output a signal containing at least one among audio data and image data from said terminal device;
   a transmission step for, when storing at least one among audio data and image data that are contained in signals supplied as output in said reception step, transmitting to said terminal device images, speech, or images and speech for providing guidance to the method of notifying the start of storage;
   a detection step for detecting notification signals transmitted from said terminal device;
   a conversion step of using detection results obtained by said detection step to convert image data of the time that storage has started to intramode; and
   a synchronization step of synchronizing between audio data and image data to shift the audio data back by adjusting the information related to a reproduction timing of the audio data depending on an increase in an amount of the image data after conversion.

8. The moving picture storage method according to claim 7, wherein said reception step includes receiving at least one among audio data and image data from said terminal device.

9. The moving picture storage method according to claim 7, wherein said reception step includes separating at least one among audio data and image data from a signal received from said terminal device.

* * * * *